United States Patent Office

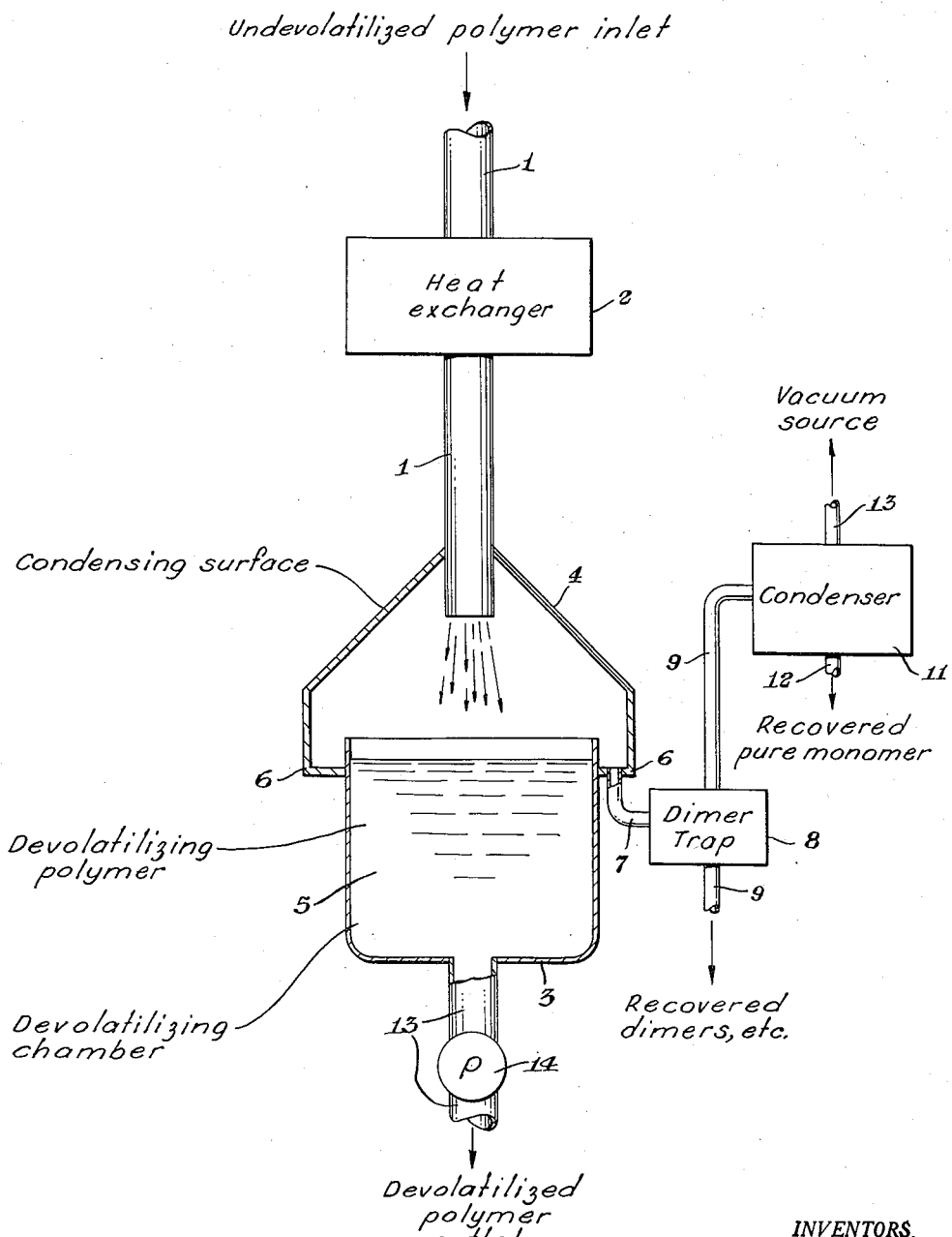

2,970,089
Patented Jan. 31, 1961

2,970,089

DEVOLATILIZING POLYMERIC COMPOSITIONS

Wilson W. Hunt, Samuel G. Ludington, and James L. Amos, Midland, Mich., assignors to The Dow Chemical Company, Midland, Mich., a corporation of Delaware Filed Jan. 9, 1957, Ser. No. 633,318

6 Claims. (Cl. 202—69)

In order to be perfected, or at least better adapted, for satisfactory utilization, many freshly prepared polymeric compositions must be devolatilized or demonomerized to rid them of undesirable volatile constituents. These may include monomers, low molecular weight polymers (particularly dimers and trimers) and various gases that may be present. It is a conventional dictate of good practice to repolymerize the monomers thus recovered in order to operate with utmost economy. However, in many instances, it is undesirable to simultaneously include low molecular weight polymers, especially dimers and trimers, along with the recovered monomer in the recycle feed to the polymerizer. This is oftentimes due to the various adverse, or even intolerable, influences that dimers, trimers and the like may exert upon a polymer product when they are included in a polymerization mass. Frequently, for example, dimers, trimers and other low molecular weight polymers may cause an objectionable coloration in a fabricatable polymeric product that has been manufactured by being polymerized in their presence.

The problem is acute when various alkenyl aromatic compounds such as styrene, alpha-methyl styrene or vinyl toluene, mono- and di-chlorostyrene, ar-dimethyl styrene and the like are involved and being polymerized into various homopolymers, copolymers of mixtures of alkenyl aromatic monomers or mixtures of alkenyl aromatic monomers with different types of monomers, and interpolymers or graft-copolymer compositions. The dimers, trimers and other low polymers (with molecular weights of less than about 300) of many alkenyl aromatic monomers, particularly styrene, are notorious chromophores that are easily capable of seriously discoloring product polymeric compositions in which they may be incorporated. Thus, their presence is generally undesirable, even in such minor proportions that may be as small as one percent or less by weight. Such order of magnitude, incidentally, is about that in which dimers, trimers and the like are usually found in the constituents that are devolatilized from polystyrene and the like compositions. As is generally understood in the art, an alkenyl aromatic compound is one that conforms to the generic formula: $G-CZ=CH_2$, wherein G is an aromatic radical and Z is selected from the group that consists of a hydrogen atom and a methyl radical.

While the volatile constituents from polystyrene and the like as well as from other polymeric compositions can be, and frequently are, purified (usually by distillation) in separate recovery systems to free them from unwanted, low molecular weight polymers and to obtain an essentially pure monomer for recycling and subsequent repolymerization purposes, it would be an advantage to avoid such ancillary monomer processing steps subsequent to devolatilization. It would be especially advantageous if substantially pure monomers, particularly styrene and the like monomers, could be directly obtained for subsequent repolymerization from a polymer devolatilizing operation.

To the accomplishment of the mentioned desiderations and corollary ends, therefore, the chief aim and concern of the present invention is to provide an improved method for devolatilizing or demonomerizing various polymeric compositions, especially polymeric compositions that are prepared to contain at least about 50 percent by weight of an alkenyl aromatic compound in their constitution, and particularly styrene polymer compositions, including polystyrene and various copolymers and graft copolymers of styrene with other monomers and polymers.

Accordingly, an undevolatilized polymeric composition, particularly a styrene polymer composition, that contains monomer and low molecular weight polymers, including dimers and trimers, among its volatile constituents can be effectively and most advantageously devolatilized by a method which comprises feeding an undevolatilized or incompletely devolatilized polymeric composition that is at a devolatilizing temperature into an enclosed chamber having a condensing surface (which preferably is an overhead condensing surface) therein; maintaining the condensing surface in said chamber at a temperature that is greater than the condensing temperature of the monomeric compound or compounds in the volatile constituents escaping from the polymeric composition being devolatilized but not in excess of a condensing temperature (under the effective pressure that is present in the devolatilizing chamber) for substantially all of the fugacious, low molecular weight polymers in said escaping volatile constituents; withdrawing subsantially pure monomer vapors from said chamber; withdrawing from said condensing surface in said chamber, as a liquid, the low molecular weight polymers that have been condensed from said volatile constituents; and withdrawing devolatilized polymer product from said chamber.

Obviously, the polymer product can be partially or completely devolatilized in the practice of the method of the present invention. As is apparent, the method of the invention is susceptible to being performed by batch-wise procedures. Preferably, however, it is conducted on a continuous basis in one or more sequential stages or repetitive steps for completely devolatilizing the polymer. During the devolatilization, it is usually highly advantageous to apply a vacuum to the devolatilizing chamber. This facilitates all aspects of the operation and greatly increases the efficiency of the method. The essentially pure monomer vapor that is withdrawn from the devolatilizing chamber may, if desired, be condensed after its recovery. It is generally in an excellent and most suitable condition for recycle to and reuse in a polymerization operation.

As has been indicated, the present invention is particularly beneficial when applied to the devolatilization of styrene polymer compositions in order to directly recover essentially pure styrene monomer free from dimer, trimer and other chromophoric low molecular weight polymers, especially those having a molecular weight less than about 300. The method may be practiced with optimum results in or with apparatus that has been patterned after that which has been disclosed by the present inventors in either of their copending applications that have Serial Nos. 633,316 and 633,317, which were concurrently filed on January 9, 1957, and which respectively cover a "Devolatilizing Apparatus" and an "Apparatus For Devolatilizing."

The method of the invention is schematically delineated in and by the accompanying drawing which, together with the ensuing description, affords further illustration of the invention. As shown, the undevolatilized polymer composition is introduced into a devolatilizing chamber 3 through an inlet conduit 1 after having been passed through suitable heat exchanging means 2 to raise it to or maintain it at an efficient devolatilizing temperature. The chamber 3 has an overhead condensing surface 4.

This surface 4 is maintained at a partial condensing temperature for the volatile constituents that are escaping from the devolatilizing polymer composition 5 being maintained in the chamber. Thus, the dimers, trimers and other undesirable, fugacious low molecular weight polymers condense on the surface 4. Advantageously, the condensing surface 4 may be a dome shaped affair with a collecting trough 6 formed at and about its lower peripheral edge. The condensate is withdrawn from the collecting trough 6 out of the chamber through a conduit 7. It proceeds thence into a dimer trap 8 from which the undesirable low molecular weight polymers are collected through an outlet 9 for disposal or other desired use.

The uncondensed monomer vapors pass out of the chamber through the conduit 7 with the condensed dimers and the like. They separate from the dimers in the trap 8 and continue, in the vapor state, through the conduit 9 to the condenser 11. At this point they may be withdrawn through outlet 12 as essentially pure, liquefied monomer.

It is an advantageous, as depicted, for the system to be connected with a suitable source of vacuum (not shown) through the vent 13. Care should be taken with the vacuum that is applied (or with any pressure that is utilized) to accurately correlate it with the temperature that is being maintained on the condensing surface 4; taking into account the particular devolatilizing effects that are being attempted. Thus, as can be appreciated, too great a vacuum or too low a pressure with given condensing temperatures may cause undesirable quantities of the monomer to be condensed and lost with the dimers and the like. Too little vacuum or not enough pressure may permit escape of intolerable proportions of the dimer, etc. as a vapor with the uncondensed monomer. In a similar fashion, variations in the condensing temperature under given pressures cause similar disadvantageous results; too cool a surface condensing too much monomer; too hot a surface losing too much dimer and the like.

It is also beneficial, especially when the monomer and dimer are evacuated through the same conduits, to maintain the passageways between the chamber and the monomer condenser at a temperature that is above the monomer condensing temperature, but below the dimer and the like vaporizing temperature. Thus, the conduit 7 and the dimer trap 8 may be advantageously heated by any desired means including steam jackets and the like. It is usually also beneficial to heat the conduit 9 leading from the dimer trap 8 to the condenser 10.

After it has been devolatilized, the polymeric composition may be withdrawn from the chamber 3 through the outlet 13, suitably with the assistance of a gear pump 14 or other desired forwarding means.

Styrene polymer compositions including polystyrene, copolymers of styrene with other alkenyl aromatic and various other polymerizable vinyl monomers and graft copolymers of styrene with various elastomeric polymers which contained unpolymerized styrene monomer and from 0.2 to 0.5 percent by weight of polymers with molecular weights less than about 300, based on the weight of the volatile constituents in the composition, and which, in an undevolatilized condition had in the neighborhood of 70 percent by weight of fabricatable polymeric solids in the composition have been successfully devolatilized on numerous repeated occasions with direct recovery of essentially pure styrene monomer by practice of the method of the invention. Optimum results were obtained in all cases when the absolute mercury pressure in the devolatilizing chamber was maintained between about 100 and 150 millimeters; with the condensing surface of the chamber at a temperature between about 100 and 125° F., by water cooling; and the monomer vapor and condensed dimer outlet line and the dimer trap jacketed with steam at an absolute pressure of 50 to 65 pounds per square inch. All of the styrene monomer directly recovered in this manner was recycled and reused in the various polymerization operations that were involved without occasioning adverse coloration of the polymer products being manufactured.

Individuals who are skilled in the art will readily recognize that the method of the invention can be advantageously employed for devolatilizing many other varieties of polymer compositions besides styrene and the like polymers, during which operations many changes and modifications in the practice of the invention may be entered into without departing substantially from the spirit and scope that are intended for it, as is set forth in the hereto appended claims.

What is claimed is:

1. The method for devolatilizing an undevolatilized liquid polymer composition that contains unpolymerized monomer and fugacious low molecular weight polymers among its volatile constituents which comprises feeding the undevolatilized polymer composition at a devolatilizing temperature into an enclosed devolatilizing chamber having an overhead condensing surface therein; maintaining the condensing surface in said chamber at a temperature that, under the effective pressure that is present in said chamber, is greater than the condensing temperature of the monomer in the volatile constituents escaping from the polymeric composition being devolatilized but not in excess of a condensing temperature for the fugacious low molecular weight polymers in said escaping volatile constituents under said pressure in said chamber; withdrawing substantially pure monomer vapors from said chamber; withdrawing from said condensing surface in said chamber, as a liquid, the low molecular weight polymers that have been condensed from said volatile constituents; and withdrawing devolatilized polymer product from said chamber.

2. The method of claim 1 wherein the devolatilizing chamber is operated under a vacuum.

3. The method of claim 1 operated on a continuous basis.

4. The method of claim 1, wherein a liquid styrene polymer composition that contains unpolymerized styrene monomer is devolatilized while effecting an absolute mercury pressure between about 100 and 150 millimeters in said devolatilizing chamber and maintaining the condensing surface at a temperature between about 100 and 125° F.

5. The method of claims 4, wherein a liquid styrene polymer composition is devolatilized that contains unpolymerized styrene monomer and less than 1 percent by weight of undesirable, fugacious polymers having a molecular weight of less than about 300, based on the weight of the volatile constituents in the composition.

6. The method of claim 5 wherein an undevolatilized liquid polystyrene composition is devolatilized.

References Cited in the file of this patent

UNITED STATES PATENTS

| | | |
|---|---|---|
| 2,388,160 | Krase | Oct. 30, 1945 |
| 2,514,207 | Johnson | July 4, 1950 |
| 2,530,409 | Stober et al. | Nov. 21, 1950 |
| 2,790,755 | Walker | Apr. 30, 1957 |
| 2,798,542 | Drewitt et al. | July 9, 1957 |